United States Patent [19]

Latsch et al.

[11] 4,134,374
[45] Jan. 16, 1979

[54] METHOD AND APPARATUS FOR DETECTING CYLINDER MALFUNCTION IN INTERNAL COMBUSTION ENGINES

[75] Inventors: Reinhard Latsch, Vaihingen; Valerio Bianchi, Hochdorf; Hans Zeller, Grafenau, all of Fed. Rep. of Germany

[73] Assignee: Robert Bosch GmbH, Stuttgart, Fed. Rep. of Germany

[21] Appl. No.: 804,023

[22] Filed: Jun. 6, 1977

[30] Foreign Application Priority Data

Jun. 10, 1976 [DE] Fed. Rep. of Germany ....... 2625971

[51] Int. Cl.² .............................................. F02P 1/00
[52] U.S. Cl. ............................. 123/117 D; 123/119 A; 123/32 EK
[58] Field of Search .......... 123/119 A, 32 EK, 198 F, 123/148 S, 117 D, 102; 235/153 R, 153 AK; 324/83 R; 73/517 B, 490, 382 R, 517 AV, 116, 136 D, 654

[56] References Cited

U.S. PATENT DOCUMENTS

| | | | |
|---|---|---|---|
| 2,655,036 | 10/1953 | Chapman | 73/659 |
| 3,583,225 | 8/1964 | Wing | 73/517 AV |
| 3,789,816 | 2/1974 | Taplin et al. | 123/32 EA |
| 3,872,846 | 3/1975 | Taplin et al. | 60/278 |
| 3,901,086 | 8/1975 | Griffiths et al. | 73/517 B |
| 3,916,307 | 10/1975 | Hekimian | 324/83 R |
| 3,923,022 | 12/1975 | Scholl | 123/117 D |
| 4,009,699 | 3/1977 | Hetzler et al. | 123/117 D |
| 4,051,822 | 10/1977 | Yoshida | 123/117 R |
| 4,052,967 | 10/1977 | Colling et al. | 123/117 D |

*Primary Examiner*—Charles J. Myhre
*Assistant Examiner*—R. A. Nelli
*Attorney, Agent, or Firm*—Edwin E. Greigg

[57] ABSTRACT

A method and apparatus for detecting cylinder malfunction by monitoring the actual rotational speed in an internal combustion engine, e.g. with an inductive transducer. This signal is compared in phase with pulses from a voltage controlled oscillator, the control voltage of which comes from an integrating circuit driven by the phase comparison signal in the manner of a phase-locked loop.

The VCO pulses are used to clock a shift register and the actual pulses provide the data input for the shift register. Thus, the relative arrival time of the two pulse trains determines the contents of the shift register. Decoding circuitry is used to interrogate the shift register and to actuate an output device when the contents of the register indicate an unsymmetric periodicity, caused by cylinder malfunction.

9 Claims, 1 Drawing Figure

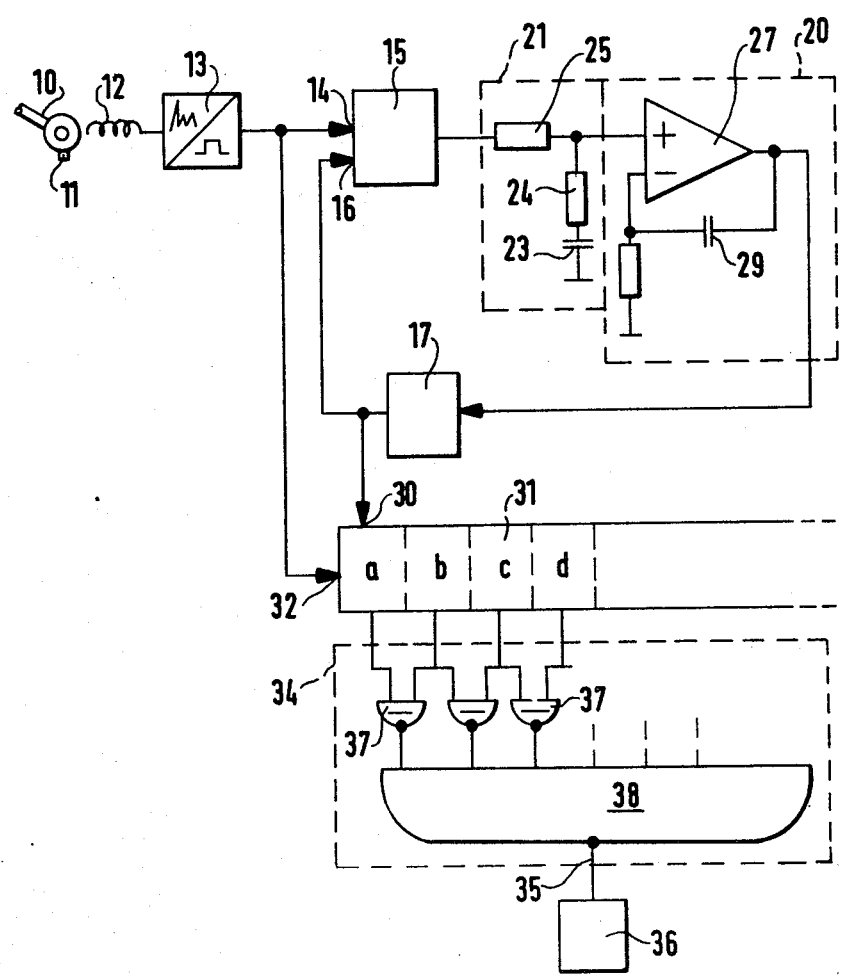

METHOD AND APPARATUS FOR DETECTING CYLINDER MALFUNCTION IN INTERNAL COMBUSTION ENGINES

BACKGROUND OF THE INVENTION

A. Field of the Invention

The invention relates to a method and an apparatus for the detection and recognition of malfunctions in one or more cylinders of an internal combustion engine. More particularly, the invention relates to the detection of such malfunctions on the basis of periodic fluctuations of the torque or the rpm of the engine.

B. State-of-the-Art

Known in the art are methods and devices for recognizing malfunctions of the engine in timely manner. Included in this overall category are the well known oil pressure gauges or warning lights and cooling medium temperature gauges. However, these devices only permit deductions as to the malfunction of particular cylinders of an engine and only after a malfunction of other engine components.

Also known in the art are devices which recognize malfunctions in the catalyzers of exhaust gas systems in internal combustion engines. For example, when the catalyzer temperature exceeds a predetermined level, these devices determine which of the cylinders of the engine is not performing properly, for example due to a failure of ignition. However, these devices are not suitable for determining malfunctions due to other causes, for example faulty compression due to excessive wear, defective piston rings or cylinder head gaskets, as well as because of faulty valves.

Also known in the art are fuel control processes which gather data as to the roughness of the engine operation and use this data for comparison with the nominal rpm of the engine and the results of the comparison are then used to adjust the fuel-air mixture to reduce excessive engine fluctuations.

OBJECT AND SUMMARY OF THE INVENTION

It is an object of the present invention to provide a method and an apparatus for recognizing any malfunctions in individual cylinders of an internal combustion engine.

It is a further object of the invention to provide a signal which may be used to activate a warning device when a cylinder malfunction is indicated.

These and other objects are attained according to the invention by providing that the actual rpm of the engine is processed to derive therefrom an average constant rpm. The phases of the actual engine speed and the derived average engine speed are compared with one another and successive results of the phase comparison are in turn compared with one another. When a periodically occurring phase deviation in the same sense is detected, the stored values of these deviations provide a signal for actuating a warning device.

This method and apparatus make it possible to recognize malfunctions without entering the combustion chamber of the engine by a recognition of the periodicity of engine speed due to the reduced power of one cylinder. This permits the early recognition of cylinder damage. An apparatus for carrying out the present invention requires relatively few electronic components of commercially available type for providing the monitoring operation without any mechanical intrusion into the engine itself.

The invention will be better understood as well as further objects and advantages thereof become more apparent from the ensuing detailed description of a preferred embodiment taken in conjunction with the drawing.

BRIEF DESCRIPTION OF THE DRAWING

The single FIGURE of the drawing is a block diagram of the components of a device for carrying out the method of the present invention.

DESCRIPTION OF THE PREFERRED EMBODIMENT

Turning now to the single FIGURE of the drawing, there will be seen a crankshaft 10 belonging to an internal combustion engine, not further illustrated, and of known construction. Attached to a suitable place on the crankshaft is a marker 11 which passes an inductive transducer 12 when the crankshaft rotates. The passage of the marker induces in the transducer 12 a signal which is passed through a pulse shaping circuit 13 to one input of a phase comparator 15. The second input 16 of the phase comparator 15 receives the output from a voltage controlled oscillator 17 which generates rectangular pulses. The control voltage of the VCO 17 is provided by a second integrating circuit 20 which is connected behind a first integrating circuit 21 the input of which is connected to the output of the phase comparator 15. The first integrating circuit 21 consists of an integrating capacitor 23 which is connected in series with resistors 24 and 25 to the output of the phase comparator 15. The junction of the resistors 24 and 25 is connected to one input of the second integrating circuit 20. The latter includes an operational amplifier 27, the non-inverting input of which constitutes its external input and is connected to the junction of the resistors 24 and 25. The feedback path of the operational amplifier includes an integrating capacitor 29 connected to the inverting input. The circuit according to the invention further includes as a major component a shift register 31 which may, for example, have eight or ten positions. The clock input 30 of the shift register 31 receives the rectangular pulses from the output of the voltage controlled oscillator 17. The data input of the shift register is connected to the output of the pulse shaping circuit 13. The outputs of the shift register 31 are connected to a decoding circuit 34, the output 35 of which may be connected to actuate a warning device 36. The decoder 34 includes a plurality of logical circuits 37, for example, as illustrated, exclusive OR gates, whose output is a logical 0 if the same signal is present at both of their inputs. The outputs of the logical OR circuits 37 are connected in parallel into, for example, a NAND gate with a suitable number of input connections equal to the number of gates 37. The inputs of the exclusive OR gates 37 are connected to the outputs of the decoder 31 in the manner illustrated, i.e., except for the first position, the shift register positions are all connected to two OR gate inputs belonging to adjacent gates. Thus, as illustrated, the first input of the first exclusive OR gate is connected to the storage location "a" and the second input of the same OR gate is connected to the storage location "b" as well as to the first input of the subsequent second exclusive OR gate. The second input of the second OR gate is then connected to the storage location "c" as well as to the first input of the third OR gate 37, and so on. The operation of the circuit described above is as follows:

Actuated by the transducer 12, the pulse shaping circuit 13 produces rectangular pulses at rpm-related frequency. These pulses thus correspond to the actual engine speed (rpm). The first integrator 21 and the second integrator 20 in combination with the voltage-controlled oscillator 17 produce a signal which is equal to a constant average rpm, derived from the actual rpm value. Thus, when the two signals present at the input of the phase comparator circuit 15 are compared, the output signal from the phase comparator 15 will indicate when the two incoming frequencies are equal in phase. In that case, the actual engine speed is equal to the average engine speed and is constant. However, if one of the cylinders is malfunctioning, thereby producing torque and speed fluctuations, the two input signals to the comparator 15 are shifted in phase and the output signal from the comparator 15 indicates a difference in frequency or rotational period with respect to the average value. Thus, when the phase difference is positive, the output will be positive and vice versa. This signal is then transformed into an output signal from the integrators which is used for controlling the voltage controlled oscillator 17. The positive-going edges of the output pulses from the VCO 17 are used as clocking pulses for the shift register 31 whereas the positive-going pulses of the output from the pulse shaper 13 are used as data for the input of the shift register 31. The relative sequence of arrival of these two positive pulse edges yields the algebraic sign of the acceleration, i.e., the change in rpm. Thus the storage locations a, b, c, d etc. continuously store and pass on logical values of either 1 or 0. It would obviously be possible to connect the output of the pulse shaper with the clock input and the output of the VCO with the data input.

If the engine is subject to a malfunction which, if due to the operation of cylinder components, almost always happens in a single cylinder, the resultant reduction of the combustion chamber pressure causes accelerations and delays which occur at a frequency equal to one-half the engine rpm, when the internal combustion engine is a 4-cycle engine with a single crankshaft marker 11. As a result, there are produced periodic phase shifts which are stored sequentially in the storage locations a, b, c, d, etc. of the shift register 31. Any periodicity is detected by the decoders and is passed on, for example, to a warning device. Such changes in engine speed also occur in normal engine operation, especially in the lean-running limit of the engine, but these fluctuations are non-systematic. By contrast, if the malfunction exhibits a regular and periodic change, such behavior may be taken to be a reliable indication of the malfunction of a cylinder. In order to obtain sufficiently precise information regarding the indicated periodicity, the shift register may contain eight or ten positions. In any case, the number of positions must be large enough that normal engine behavior cannot actuate the warning device. The contents of the positions of the shift register are interrogated by the exclusive OR gates, the output of which carries a logical 1 only if the inputs are connected to different signals. Only if all the outputs of all the exclusive OR gates 37 have a logical 1 does the output of the NAND gate 38 show a logical 0. In all other cases, the output of the NAND gate 38 is a logical 1. The warning device 36 would suitably constructed to be actuated by a logical 0.

It will be appreciated that the type of logical circuitry used could be altered, for example by the use of an AND gate at the output as well as by the use of coincidence gates followed by NOR or OR gates.

A threshold circuit may be installed ahead of the data input so as to prevent the passage of small signals which might simulate a periodic fluctuation, thereby permitting the passage only of signals of definite magnitude.

The warning device 36 actuated by the decoder 34 may be a lamp or horn or some other device. The output of the decoder may also be used to shut off the engine. The method and apparatus of the present invention may be used particularly favorably in connection with a known rough-running control system which already includes the pulse shaper 13, the phase comparator 15 and the phase locked loop consisting of the integrators 21 and 20 and the voltage controlled oscillator 17. A particular advantage of such a combination is that large disturbances which cause an enrichment of the fuel-air mixture are recognized immediately. The apparatus of the invention may also be used for monitoring the function of an exhaust gas catalyzer and for use as an independent monitoring system for fixed installations of internal combustion engines, for example as a diagnostic tool in work shops. It may also be used advantageously, especially in the latter case, for the adjustment of multi-carburetor engines.

The foregoing relates to preferred exemplary embodiments of the invention, it being understood that other embodiments and variants thereof are possible within the spirit and scope of the invention.

What is claimed and desired to be secured by Letters Patent patent of the United States is:

1. A method for detecting malfunctions in individual cylinders of an internal combustion engine, comprising the steps of
   generating first electrical pulses in synchronism with the rotation of an engine member;
   providing a phase comparator for generating a control signal and applying said first electrical pulses to one signal input of said phase comparator;
   applying said control signal to a signal generator to thereby generate a train of second electrical pulses having a frequency equal to the average frequency of said first pulses and applying said second pulses to the other input of said phase comparator;
   providing a shift register having a data input and clock input and applying the first pulses to one of the inputs of the shift register and applying the second pulses to the other input of the shift register, thereby storing in the shift register a sequence of phase data bits indicating the sense of the relative phase difference between the first and second pulses; and
   triggering a warning device when all of the data bits in the stored sequence indicate the same sense of relative phase difference between the first and second pulses.

2. A method as defined by claim 1, wherein phase data signals bits are generated only when the relative phase difference between said first and second pulses exceeds a minimum value.

3. An apparatus for detecting malfunctions in individual cylinders of an internal combustion engine, comprising:
   transducer means disposed near a rotating engine member, for generating first signals related to engine crankshaft speed;
   pulse former means for generating well-defined first pulses from said first signals;

phase comparator means for receiving said first pulses at one of its inputs;

voltage controlled oscillator means for generating second pulses fed to the second input of said phase comparator means;

circuit means for receiving the output from said phase comparator means and for generating a control signal for so controlling the frequency of said voltage controlled oscillator means as to equal the average frequency of said first pulses;

a shift register, having a clock input and a data input, one of which is connected to receive said first pulses and the other of which is connected to receive said second pulses thereby storing in said shift register a sequence of phase data bits indicative of the sense of the phase difference between said first and second pulses;

decoder means for receiving the stored data bits from said shift register and for providing a drive signal when said stored data bits satisfy predetermined logical conditions.

4. An apparatus as defined by claim 3, wherein said decoder means includes logical gates the outputs of which indicate equivalence or non-equivalence of the data present at their inputs, and wherein said inputs of said logical gates are connected to the data positions of said shift register in sequential manner and wherein the outputs of said logical circuits are connected to respective inputs of a logically additive circuit element.

5. An apparatus as defined by claim 4, wherein said transducer means cooperates with a single crankshaft member, and wherein said internal combustion engine is a 4-cycle engine.

6. An apparatus as defined by claim 5, wherein each of said logical gates in said decoder means has two inputs and wherein one of said inputs is connected to one storage location of said shift register while the second of said inputs of each gate is connected to the next following data position of said shift register and is also connected to one of the inputs of the next logical gate.

7. An apparatus as defined by claim 3, wherein said circuit means for receiving the output from said phase comparator means includes a first integrating circuit consisting of passive circuit elements and connected thereto a second integrating circuit including an operational amplifier having a feedback capacitor, the output of said operational amplifier being connected to the control input of said voltage controlled oscillator means.

8. An apparatus as defined by claim 3, further comprising indicator means for providing a sensible signal under control of said drive signal.

9. An apparatus as defined by claim 3, further comprising means for protecting the integrity of an exhaust gas catalyzer, driven by said drive signal from said decoder means.

* * * * *